Figures 1, 2:
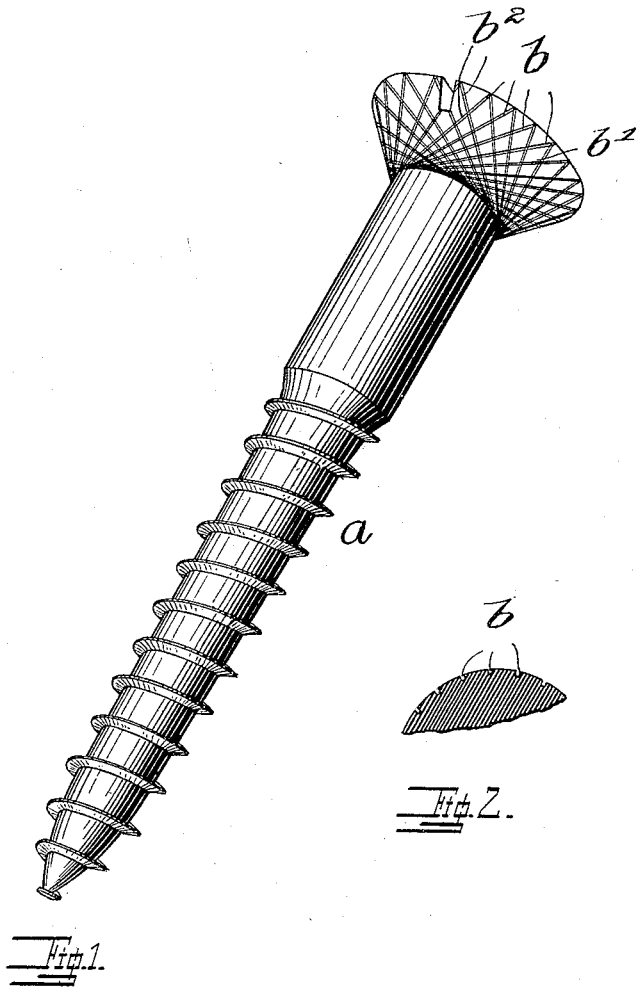

(No Model.)

M. HERZBERG & T. L. NORMAN.
WOOD SCREW.

No. 493,585. Patented Mar. 14, 1893.

Witnesses
L. F. Hayden.
S. M. Wood

Morris Herzberg,
Thomas L. Norman, Inventors

By their Attorneys.

United States Patent Office.

MORRIS HERZBERG, OF CHAMBERS COUNTY, ALABAMA, AND THOMAS L. NORMAN, OF WEST POINT, GEORGIA.

WOOD-SCREW.

SPECIFICATION forming part of Letters Patent No. 493,585, dated March 14, 1893.

Application filed March 10, 1892. Serial No. 424,473. (No model.)

*To all whom it may concern:*

Be it known that we, MORRIS HERZBERG, of Chambers county, Alabama, and THOMAS L. NORMAN, of West Point, in the county of Troup and State of Georgia, have made certain new and useful Improvements in Self-Countersinking Wood-Screws; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates as above stated to wood-screws having reference to providing a self-countersinking element therefor, which shall not increase the manufacturing cost thereof and also one that will properly perform the said operation, and at the same time provide a suitable bearing surface on the wood and a bearing surface on iron plates, either of which shall be as good as in an ordinary screw, the details of all of which will be hereinafter fully specified.

The accompanying drawings illustrate the invention in Figure 1 in perspective and in Fig. 2 in section, the former showing the device complete and the latter being a section through the head showing the preferable form of the grooves.

Corresponding reference marks designate like parts in both figures.

In these drawings $a$ is the screw and $b$ are grooves which are cut in the under side of the head in the manner and for the purpose as hereinafter specified. Upon reference to Fig. 2 of the drawings it will be seen that these grooves have sides about perpendicular, that is, as near so as it is practicable to make them, and that they are cut in the under side of the head in such a manner as to not disturb the general conicality or in other words the continuity of bearing of the conical head any more than is absolutely necessary. It will also be seen on reference to Fig. 1 that these grooves depart from the radial in both directions, that is that they extend across the conical part of the head in tangential direction and that they are so arranged as to intersect and form diamond and rhomboidal sections between them having parting corners $b'$ and sides $b^2$ inclined to the direction of the motion of the screw in turning into place. All woods are more or less soft and elastic and hence the grooves $b$ will fill with the wood-fiber as soon as the screw reaches its bottoming point, abrading and gathering same as it is forced into place, the corners $b'$ and the edges $b^2$ materially aiding in this abrasion. This filling up of the said grooves with wood, which is of course compressed into a hard state, provides the best possible frictional bearing for the head of the screw on a wood surface, while from the fact that there is no projection beyond the general level of the surface of the head, said head will find a good bearing on an iron surface, such as the countersinks in builders' hardware and analogous metallic articles. This device when once run to its proper depth stops as the grooves are filled with compressed wood and will cut no more, hence any screw once settled in place may be removed and reinserted without countersinking deeper in "turning down hard" again. These grooves do not materially weaken the head, and in it there is a solid smooth bearing when inserted that does not break the grain or sink into the wood under strain on the screw.

Having thus described our invention, what we claim as new, and desire to secure by Letters Patent of the United States, is—

A wood screw having on the under side of its head two sets of narrow, inclined grooves, said grooves crossing each other and the grooves of one set being inclined in an opposite direction to those of the other set, substantially as described.

In testimony whereof we hereunto set our hands in presence of two witnesses.

MORRIS HERZBERG.
THOMAS L. NORMAN.

Witnesses:
W. C. LANIER,
J. C. McKERNIE.